April 1, 1924.
B. B. CAYFORD
SAW ATTACHMENT FOR VEHICLES
Filed Jan. 19, 1921
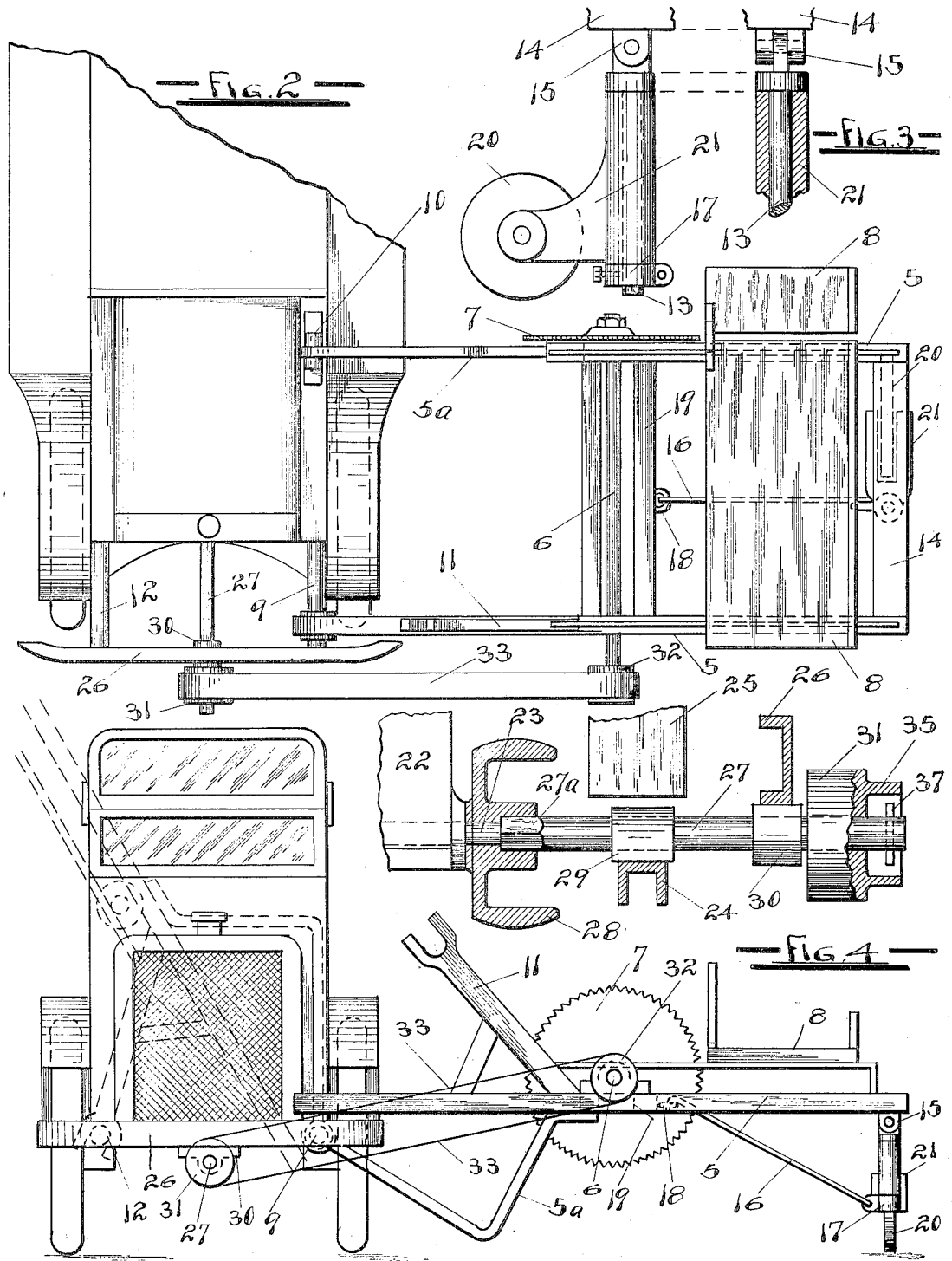
INVENTOR
BENJAMIN B. CAYFORD
BY
C. F. Blake
ATTORNEY Patented Apr. 1, 1924.

1,488,976

UNITED STATES PATENT OFFICE.

BENJAMIN B. CAYFORD, OF PORTLAND, OREGON, ASSIGNOR OF ONE-HALF TO ROY RATHMAN, OF PORTLAND, OREGON.

SAW ATTACHMENT FOR VEHICLES.

Application filed January 19, 1921. Serial No. 438,493.

*To all whom it may concern:*

Be it known that I, BENJAMIN B. CAYFORD, a citizen of the United States, residing at Portland, county of Multnomah, State of Oregon, have invented certain new and useful Improvements in Saw Attachments for Vehicles, of which the following is a specification.

My invention relates to saw attachments for vehicles in general, and particularly to such attachments as are used upon automobiles, the object of my invention being to provide such an attachment that will be extremely rigid when in use, that will not interfere with the movement of the automobile when the attachment is in working position, and that may be folded upon the automobile for transportation.

I accomplish the above objects by means of the construction illustrated in the accompanying drawing, which is a part of this application for Letters Patent, like characters of reference indicating like parts throughout the several views thereof, and in which:

Fig. 1 is an end elevation of an automobile with my device attached thereto in working position.

Fig. 2 is a plan view of the subject matter of Fig. 1.

Fig. 3 is a detail of the castor wheel arrangement.

Fig. 4 is a detail of the power shaft arrangement.

In general my device consists of a saw frame pivotally mounted upon an automobile to swing transversely thereof, a foldable castor wheel device to support the outward end of said frame when the latter is in working position, means to support said frame when the latter is folded back upon the automobile, and a power shaft arrangement for transmitting power from the automobile motor to the saw in the frame by means of a belt.

The saw frame is of the ordinary construction, consisting of the frame members 5, saw arbor 6 mounted thereon, saw 7 upon said arbor, and sliding table 8.

The frame members 5 are each pivotally mounted upon the automobile frame in front thereof so that said frame members 5, together with their attached parts, may be swung vertically and transversely upon the automobile, as illustrated in dotted lines in Fig. 1, in which position the device is readily transported.

The forward member 5 is conveniently pivotally mounted upon one of the supports of the fender or bumper 9, and the rearward member 5 is pivotally mounted upon the automobile side frame by means of suitable brackets 10. To enable the latter frame member 5 to clear the motor hood or other obstructions upon the automobile I provide said member with a bent portion 5ª which clears the hood as shown in Fig. 1.

To support the device in its position for transporting I provide a strut or member 11 having a forked end thereon adapted to embrace the bumper support 12 opposite the similar support 9 upon which latter the device is pivotally mounted, said member 11 thus supporting the device in the dotted line position shown in Fig. 1.

To support the outer end of the device when in working position, and at the same time provide means for moving the automobile together with the device in such working position, I provide a castor wheel arrangement shown in detail in Fig. 3. A pin 13 is pivotally mounted upon the frame cross member 14 by means of suitable brackets 15, said pin swinging in a vertical plane parallel to the members 5. A brace rod 16 is pivotally connected to the pin 13 by means of a collar 17 secured upon said pin, and said brace rod is hooked into an eye 18 upon a cross member 19 of the saw frame. The castor wheel 20 is mounted in the usual forked member 21 which is rotatably mounted upon the pin 13. By this construction the castor wheel operates in the usual manner when the device is in working position as shown in Fig. 1, but may be folded against the frame of the device when in transportation.

The driving element for the device is illustrated in detail in Fig. 4, wherein is shown in diagrammatic form the motor 22, motor shaft 23, automobile body front member 24, radiator 25 and bumper 26. There is upon every automobile motor a member mounted upon the motor shaft 23, said member being usually either a timing gear, or, as illustrated in Fig. 4, a belt pulley for the radiator fan. This member I replace with a similar member adapted to function as a coupling between the motor shaft 23 and an auxiliary shaft 27, a convenient means of accomplishing this being to provide the member 28 with a squared orifice within the hub thereof adapted to receive the squared end 27ᵃ of the shaft 27. Said shaft 27 is journaled within a suitable bearing 29 secured to the automobile frame member 24 and also within a similar bearing 30 secured to the bumper 26. Upon the forward end of said shaft 27 is secured a pulley 31 which is connected to a pulley 32 upon the saw mandrel 6 by a belt 33.

Suitable means is provided upon the forward end of the shaft 27 for receiving the starting crank of the automobile, such means consisting conveniently of a pin 37 transversely secured in said shaft and a flange 35 upon the pulley 31 housing the pin 37, said pin being adapted to receive the ratchet teeth of the starting crank in the usual manner.

My device may be made of any size and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claim.

Having disclosed my invention so that others may be enabled to construct and to use the same, what I claim as new, and desire to secure by Letters Patent is:

A frame pivotally mounted upon an automobile and extending sidewise therefrom, and adapted to be folded thereupon; a castor wheel upon said frame forming supporting means therefor when said frame is extended from the automobile; a strut forming supporting means for said frame when the latter is arranged for transportation; machinery devices upon said frame; and means to operate said machinery devices from the motor of the automobile.

In witness whereof I claim the foregoing as my own I hereunto affix my signature in the presence of two witnesses at Portland, county of Multnomah, State of Oregon, this 6th day of Jan., 1921.

BENJAMIN B. CAYFORD.

Witnesses:
L. J. ROBINSON,
C. F. BLAKE.